United States Patent [19]

Kiema

[11] Patent Number: 5,392,282

[45] Date of Patent: Feb. 21, 1995

[54] CIRCUIT ARRANGEMENT IN A MOBILE PHONE FOR A DIGITAL MOBILE TELEPHONE SYSTEM

[75] Inventor: Arto Kiema, Salo, Finland

[73] Assignee: Nokia Mobile Phones, Ltd., Salo, Finland

[21] Appl. No.: 1,281

[22] Filed: Jan. 7, 1993

Related U.S. Application Data

[63] Continuation-in-part of Ser. No. 785,862, Oct. 28, 1991, abandoned, which is a continuation of Ser. No. 501,617, Mar. 26, 1990, abandoned.

[30] Foreign Application Priority Data

May 17, 1989 [FI] Finland .................................. 892371

[51] Int. Cl.⁶ ............................................ H04J 3/00
[52] U.S. Cl. ...................................................... 370/77
[58] Field of Search ...................... 370/94.1, 77, 110.1,
370/112, 118; 379/58, 57, 64, 59; 455/31.1,
33.1; 380/49; 375/122; 371/30, 40.2, 40.4, 5.1

[56] References Cited

U.S. PATENT DOCUMENTS 4,512,016  4/1985  Fulcomer, Jr. et al. .......... 370/110.1
4,512,017  4/1985  Nici et al. ............................ 370/110.1
4,991,169  2/1991  Davis et al. ............................. 370/77

Primary Examiner—Douglas W. Olms
Assistant Examiner—Dang Ton
Attorney, Agent, or Firm—Darby & Darby

[57] ABSTRACT

A mobile phone with a basic unit provided with a memory necessary for the processing of speech signals only, whereby the processing of the possible data signals is carried out in an auxiliary unit connected to the interface, the auxiliary unit comprising the memory required for the processing of the data signals.

8 Claims, 1 Drawing Sheet

CIRCUIT ARRANGEMENT IN A MOBILE PHONE FOR A DIGITAL MOBILE TELEPHONE SYSTEM

RELATED APPLICATIONS

This application is a continuation-in-part of U.S. patent application Ser. No. 07/785,862, filed on Oct. 28, 1991, (now abandoned), which was a continuation of U.S. patent application Ser. No. 07/501,617, filed Mar. 26, 1990, (now abandoned).

FIELD OF THE INVENTION

The present invention relates generally to communication systems and, more specifically, to a mobile telephone capable of both speech and data communication in a digital mobile telephone system.

BACKGROUND OF THE INVENTION

Mobile telephone use has evolved into a critical communication link for information flow. Originally, mobile telephones were capable of transmitting and receiving only speech signals. The proliferation of data transmission, such as facsimile and computer information, made it necessary for mobile telephones to be capable of both speech and data communication. This additional capability has been achieved primarily through the use of digital telephone network that are capable of converting analog speech signals to digital signals and combining them with the digital data signals. Examples of such digital telephone networks are the Pan-European digital mobile system Groupe Special Mobile (GSM) and a proposed U.S. system. The mobile digital telephone systems typically employ a type of time division multiplexing or "burst" communication where each burst contains several bits of digital information arranged according to a frame format defined in the standard for the system. Frames of information are divided into time slots, with each time slot being one or to more bits. The information conveyed in the time slots can be speech, data, or control signals.

The control signals determine whether a speech-only call or a speech and data call will be established between the mobile telephone and the mobile telephone system. In a speech-only call, the mobile telephone need only extract the appropriate time slot information designated as speech information according to the frame format. In a speech and data call, the mobile telephone must extract the appropriate signals from the speech time slots as well as from the data time slots. The received speech or speech and data information must then be stored in memory for processing by the mobile telephone. It is thus seen that a speech-only mobile telephone requires less memory than a speech and data telephone. A mobile telephone's memory is costly and consumes considerable power, thus, there is a need for mobile telephone circuit arrangements that provide speech or speech and data capabilities while at the same time reducing cost, power consumption, and complexity.

Because not all mobile telephone users require data capabilities, one possible solution to the above mentioned disadvantages is to offer two types of mobile telephones, a speech-only version and a speech and data version. In so doing, the speech-only version is not burdened with the added complexity, cost, and power consumption needed to provide data capabilities. The purchaser of a voice only mobile telephone who later desires to add data capabilities must discard his speech only telephone and purchase a speech and data version, thereby wasting his initial capital investment.

SUMMARY OF THE INVENTION

The present invention eliminates these drawbacks.

The invention relates to a modular mobile telephone having two separate modules: a speech-only module, and a data-only adaptor module. A speech-only mobile telephone is achieved with the use of the speech-only module, which comprises a fully functional mobile telephone capable of transmitting and receiving signals to and from the mobile telephone system. A speech and data mobile telephone is achieved via the addition of a data module to the speech module. The data adaptor module provides all the added circuitry required for processing data signals. The radio telephone can be designed so that the data module can be purchased separately and added on to the speech-only telephone. The data module may be capable of processing both data signals received from the mobile telephone system and signals received directly from a data terminal.

In one embodiment, the adaptor has digital data encoding and multiplexing circuits as well as decoding and demultiplexing circuits. It also contains the additional memory necessary for digital operation. This memory may be substituted or used in combination with the speech-only memory. Further memory may be provided for connecting the data adaptor module directly to a data terminal.

BRIEF DESCRIPTION OF THE DRAWING

The invention is described below referring to FIG. 1.

DETAILED DESCRIPTION OF THE PREFERRED EMBODIMENT

Figure 1:
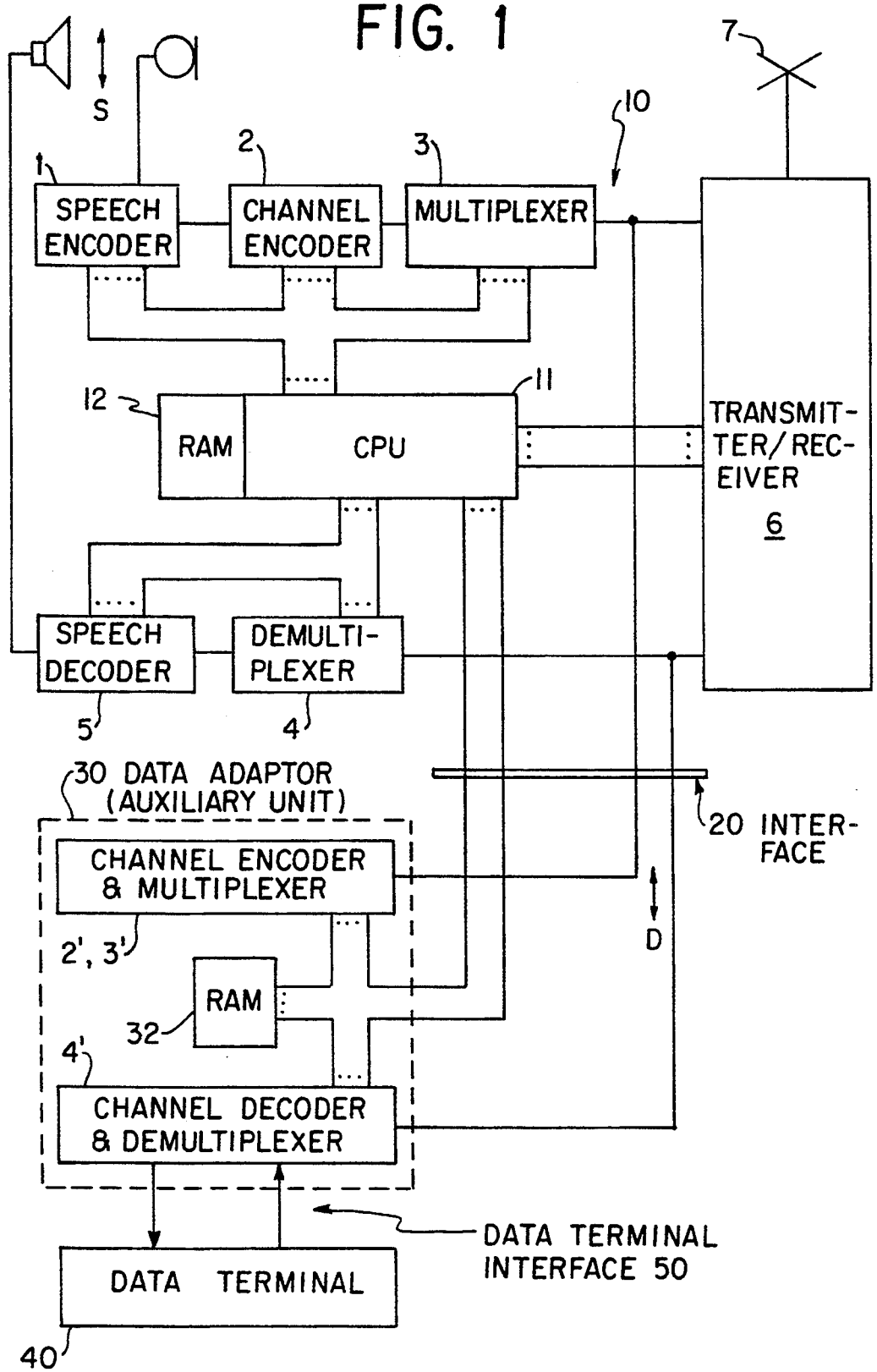
FIG. 1 is a block diagram of a mobile telephone according to the present invention. The figure illustrates the principal functional blocks. A person skilled in the art can realize the functional blocks with logic circuitry in a variety of ways without undue experimentation.

The functional blocks of a mobile telephone include a transmitter/receiver (6) which receives "bursts" of information transmitted from the mobile telephone system, and transmits information from the mobile telephone to the mobile telephone system. Additionally, the transmitter modulates and demodulates the transmitted and received signals, respectively, according to the relevant modulation requirements for the mobile telephone standard being implemented. For example, if the standard being implemented were the Groupe Special Mobile (GSM) standard of the Pan-European digital mobile telephone system, the modulating technique employed would be Minimal Shift Keying (MSK). Other mobile telephone standards, such as that for the U.S. digital system, may also be used.

Further, in the transmit direction, the functional blocks of a mobile telephone include a speech encoder (1), a channel encoder (2), and a multiplexer (3). The speech encoder (1) converts input analog speech signals into digital bits and compresses the digital bits in order to remove redundant information and reduce the amount of information that is required to be transmitted. The speech encoder may be, for example, a pulse excited linear predictive coder with a long-term prediction. The channel encoder (2) generates error correction patterns that are added to the compressed digital bit stream output from the speech encoder (1). The multiplexer (3) arranges the compressed digital bits and the error correcting bits into appropriate time slot information, which is then transmitted by the transmitter/receiver (6) to the mobile telephone system in the appropriate speech time slots according to the frame structure defined in the relevant digital mobile telephone communication standard.

In the receive direction, the functional blocks of a mobile telephone include a demultiplexer/channel decoder (4) and a speech decoder (5). The demultiplexer/channel decoder (4) extracts the appropriate speech time slot information from the received information from the mobile telephone network, as well as stripping away the error correction bits and performing any necessary error correction. The speech decoder (5) expands the received compressed speech data and converts it into analog form for further audio processing.

The architecture of the mobile telephone is implemented with a microprocessor based central processing unit (CPU) (11) and a random access memory (RAM) (12). The CPU (11) controls the other functional blocks and stores information in the RAM (12). The size of the RAM (12) is determined mainly by the frame format and data structure of the particular digital mobile telephone standard being implemented. Additionally, a small amount of memory is required for the control and operation of the various functional blocks.

For example, if the standard being implemented were GSM, the RAM (12) would be sized based on the particular parameters of the GSM standard. In the GSM standard, each time slot contains 114 bits. For a speech-only call, there are 8 time slots of speech information and 4 time slots of control signal. Thus, each frame is (8+4)*114=1,368 bits. In addition, the mobile telephone must be capable of storing 4 frames of received information. Therefore, the required memory for the receive function is 1,368*4=5,472 bits. In the transmit direction, the transmitter need only be capable of storing 1 frame of information or 1,368 bits. Thus, the total memory required for the transmit/receive portion of a speech-only mobile telephone is (5,472+1,368)=6,840 bits. These figures will vary for other mobile telephone system standards.

In the case of a speech and data call, the time slots are still 114 bits. However, there are 8 time slots of speech information, 4 time slots of control signal, and 15 time slots of data information per frame. Since the receiver portion must be capable of storing 4 received frames, the required receive memory will be (8+4+15)*114*4=12,312 bits. In the transmit direction, the transmitter only needs to store 1 frame of information which is (8+4+15)*114=3,078 bits. Thus, the total memory required for the transmit/receive portion of a speech and data mobile telephone is (12,312+3,078)=15,390 bits.

The modular approach of the present invention results in a circuit arrangement for a speech-only mobile telephone that requires significantly less memory than a speech and data version. For example, under the GSM standard, a speech-only module requires less than half the memory of a speech and data module (6,840 versus 15,390).

In order to facilitate the use of a modular design, the speech-only module is provided with an interface (20), to which a data adaptor or auxiliary terminal (30) can be connected. This interface (20) may be a fast bus interface. The data adaptor (30) comprises substantially similar functional blocks to those found in the speech-only module. Specifically, the data adaptor (30) contains a channel encoder (2') and a multiplexer (3') similar to channel encoder (2) and multiplexer (3). Also, the data adaptor (30) contains a demultiplexer/channel decoder (4') similar to demultiplexer/channel decoder (4).

The data adaptor (30) communicates with the CPU (11) via the interface (20). In the GSM system, for example, the control signal received by the CPU indicates whether the received signal contains voice only or voice and data. The CPU (11) in accordance with the protocol being implemented will disassemble received frames and route speech information to the demultiplexer/channel decoder (4) and data information to the demultiplexer/channel decoder (4') in the data adaptor. Likewise, in assembling a frame to be transmitted the CPU (11) will route speech information from the multiplexer (3) and data information from multiplexer (3') to the transmitter portion of the transmitter/receiver (6). The data adaptor may also be directly connected to a data terminal (40) via a data terminal interface (50) to receive data-only signals from a data source.

The additional RAM (32) in the data adaptor (30) will be used by the CPU (11) either as either an additional RAM (12) or a replacement for RAM (12). For example, in the case of the GSM standard, RAM (12) may be about 7,000 bits for a speech-only configuration. In the case of speech and data, RAM (32) may be used as a replacement for RAM (12), in which case it would be about 16,000 bits in order to satisfy the memory requirements for a speech and data mobile telephone. Alternatively, it may be about 4,000 bits and used in combination with RAM (12).

The mobile telephone can be arranged so that the data adaptor can be added onto a speech-only phone. That is, a user can purchase a speech-only phone and later purchase the data adaptor, which will plug into an interface constructed in the speech-only mobile phone.

While the present invention has been particularly shown and described with reference to preferred embodiments thereof, it is understood by those skilled in the art that various changes in the form and details may be made therein without departing from the spirit and scope of the invention.

What is claimed is:

1. A circuit arrangement for a mobile telephone operating according to a digital mobile telephone system comprising:

a speech only module including:
  a transmission function module including speech coding means for converting speech into compressed digital form, channel coding means for generating error correction patterns and combining the error correction patterns with the compressed digitized speech, and multiplexing means for arranging digital bits of the combined error correction patterns and compressed digitized speech into appropriate time slots of a multiplexed signal;
  a receiver function module including demultiplexing/channel decoding means for extracting speech information from the multiplexed signal and performing error correction;
  a transmitter/receiver function module including modulating means for modulating the multiplexed signal according to a digital mobile telephone standard;
  a memory unit having a first storage capacity no larger than that necessary to accommodate a speech-only call between the mobile telephone and the mobile telephone system; and a central processing unit for controlling the circuit arrangement and storing information in the memory unit; and an adaptor unit connected to the speech-only module the adaptor unit having encoding and decoding means for transmission and reception of non-speech data information from the speech-only module and an auxiliary memory unit having a second storage capacity, the combined storage capacity of the memory unit and auxiliary memory unit being at least sufficient to maintain a speech and data call between the mobile telephone and the mobile telephone system.

2. The circuit of claim 1, further including an interface for connecting the adaptor unit to the transmitter/receiver function module and the central processing unit.

3. The circuit of claim 2, wherein the interface is a fast bus interface.

4. The circuit of claim 1, wherein the memory unit and auxiliary memory unit are random access memories.

5. The circuit of claim 1, wherein a majority of the storage capacity of the memory unit and auxiliary memory unit hold data for channel decoding and demultiplexing, the memory unit having a storage capacity less than half the size of the auxiliary memory unit.

6. The circuit of claim 1, wherein the auxiliary memory unit is sufficient alone to maintain a speech and data call between the mobile telephone and the mobile telephone system.

7. The circuit of claim 1, wherein the adaptor unit is selectively connectable to the mobile telephone via the interface.

8. The circuit of claim 1, wherein the adaptor unit includes a data interface to receive data signals from a data terminal to be connected to the mobile telephone.

* * * * *